(12) United States Patent
Starodubov et al.

(10) Patent No.: US 8,849,078 B2
(45) Date of Patent: Sep. 30, 2014

(54) HIGH POWER LASER SYSTEM WITH MULTIPORT CIRCULATOR

(71) Applicants: Dmitry Starodubov, Dudley, MA (US); Hongbo Yu, Shrewsbury, MA (US); Alex Yusim, Bioston, MA (US)

(72) Inventors: Dmitry Starodubov, Dudley, MA (US); Hongbo Yu, Shrewsbury, MA (US); Alex Yusim, Bioston, MA (US)

(73) Assignee: IPG Photonics Corporation, Oxford, MA (US)

( * ) Notice: Subject to any disclaimer, the term of this patent is extended or adjusted under 35 U.S.C. 154(b) by 219 days.

(21) Appl. No.: 13/625,289

(22) Filed: Sep. 24, 2012

(65) Prior Publication Data
US 2014/0086526 A1     Mar. 27, 2014

(51) Int. Cl.
| | |
|---|---|
| G02B 6/26 | (2006.01) |
| G02B 6/42 | (2006.01) |
| H01S 3/30 | (2006.01) |
| H01S 3/10 | (2006.01) |
| G02B 6/27 | (2006.01) |
| G02B 6/02 | (2006.01) |

(52) U.S. Cl.
CPC .............. *G02B 6/268* (2013.01); *G02B 6/2746* (2013.01); *G02B 6/4296* (2013.01); *G02B 6/02057* (2013.01)

USPC ........................ 385/29; 372/6; 372/9; 372/21

(58) Field of Classification Search
USPC ......... 385/3, 6, 10–12, 15–16, 23–24, 26–28, 385/32, 37, 39, 122–124, 126–127, 129, 385/132; 372/6, 18, 21
See application file for complete search history.

*Primary Examiner* — Ryan Lepisto
*Assistant Examiner* — Erin Chiem
(74) *Attorney, Agent, or Firm* — Yuri Kateshov, Esq.; Timothy J. King, Esq.

(57) ABSTRACT

A high power (HP) fiber circulator is configured with a case enclosing a plurality of optical components which are arranged so as to define multiple ports. The fiber circulator further includes a plurality of launching and receiving fiber components each of which has spliced delivery and pigtailed passive fibers selectively coupling a HP input signal into and receiving a HP output signal from respective input and output ports. The passive fibers of each fiber component have respective protective coatings spaced from one another and each covering the cladding of the fibers. A light stripper, extending between the protective coatings, is operative to substantially remove cladding-supported light from one of the passive fibers before it reaches the protective coating of the other passive fiber. At least one of the ports includes a wavelength selective component configured to direct the HP input light beam along the desired path between the ports and including a fiber Bragg grating, volume Bragg grating or a combination of these.

5 Claims, 10 Drawing Sheets

HIGH POWER LASER SYSTEM WITH MULTIPORT CIRCULATOR

BACKGROUND OF THE DISCLOSURE

1. Field of the Disclosure

The present disclosure relates generally to high power fiber laser systems, and in particular, to high power laser systems provided with a multi-port pigtailed directional selective router operating at high powers.

2. Prior Art

A multi-port optical component, such as circulators, is a light-directional device operative to route incoming signal between fibers. Configured as a multi-port structure, a circulator is operative to collect the light and direct it to a following output port. This operation is repeated over and over again depending on the number of ports. A light path between multiple ports is thus fixed and cannot be voluntarily changed.

Typically, optical circulators are used for low power applications such as bi-directional wavelength division optical multiplexing, bi-directional wavelength division optical add/drop multiplexing, three-way channel separation, bi-directional optical amplification, two-way multiplexing, three-way multiplexing, and optical dispersion compensation.

These devices have issues with handling high optical powers due to a number of reasons. First, the optical beam size is very small due to the compact size of this device. This, in turn, increases the optical intensity inducing either optical nonlinearities (such as thermal lensing) or decreasing the damage threshold of the device (in part by surface damage threshold and in part by bulk damage threshold). Second, the heat dissipation of the known devices may not be adequate because the heat path through epoxies and RTVs. Third, stress birefringence, due to non-uniform heating of optical components, causes changes in the optical properties of the components and degrades the optical performance. Fourth, the optical coatings, covering the components, do not have a high enough damage threshold. Fifth, the optical epoxy in the path of the optical beam has a low damage threshold. Due to one or a combination of these reasons, the known configurations of the optical circulator may not adequately handle high powers.

A need, therefore, exists for a CW and pulsed high power single-mode fiber laser systems each configured with a fiber pigtailed directional router that can operate powers of up to kWs.

Another need exists for a high power single mode fiber laser system with ring and coupled cavity configurations each provided with a fiber pigtailed directional router.

Another need exists for a high power single mode fiber system provided with a fiber pigtailed directional router configured to suppress parasitic signals so as to increase a threshold for optical nonlinearities.

Another need exists for a high power single mode pulsed fiber laser system with the wave-selecting router configured to provide for short pulse stretching and compressing in high power pulsed lasers.

A further need exists to combine and separate high power signals via wavelength division multiplexing by utilizing a high power fiber pigtailed directional router.

SUMMARY OF THE DISCLOSURE

These needs are satisfied by a HP fiber laser system configured with a pigtailed fiber router which is structured to handle a plurality of optical signals reaching the kW levels.

According to one aspect, the disclosed high power single mode (HPSM) fiber laser system is configured with at least one fiber pigtailed directional router having a plurality of ports which receive respective launching and receiving fiber components. The components each having a passive single mode (SM) delivery fiber which is fused to a pigtailed single mode passive fiber. The SM pigtailed and delivery fibers of each component are configured with respective protective coatings spaced from one another and protected from being damaged by a light stripper. The light stripper includes a volume of material extending between the protective coatings and operative to distributively remove a portion of cladding-guided radiation before it reaches one of the protective coatings located along a downstream stretch of radiation path.

According to a further aspect the disclosed directional router is configured with multiple ports each receiving the pigtailed passive fiber so that a SM input radiation guided by the launching component is coupled into the input port and an output radiation is launched into the pigtailed fiber of the receiving component over free space. The directional router is configured as a multi-port circulators configured to operate at high powers either as a multiplexer/demultiplexer or as an isolator depending on the configuration of HPSM fiber laser system.

To effectively handle high powers, the disclosed router includes a case enclosing a plurality of optical components which are all mounted on a heat dissipating plate disposed upon one of the inner surfaces of the case. The heat dissipating plate is made from material with a high heat-conductive coefficient which effectively evacuates heat from the case. To provide the router with necessary ruggedness, the heat plate is covered by a layer of epoxy cementing the optical components while located off the light path. The surfaces of the optical components impinged by radiation are all covered by an anti-reflecting coating minimizing the temperatures within the case.

In accordance with a further aspect, a variety of configurations of HPSM fiber laser systems utilize the disclosed router. The use of the router allows for all disclosed HPSM fiber systems effectively operate at elevated powers.

BRIEF DESCRIPTION OF THE DRAWINGS

The above and other features and configurations will become more readily apparent from the following specific description in conjunction with the drawings, in which.

SPECIFIC DESCRIPTION

Reference will now be made in detail to the disclosed high power laser system and circulator incorporated therein. Wherever possible, same or similar reference numerals are used in the drawings and the description to refer to the same or like parts or steps. The drawings are in simplified form, far from precise scale.

Figure 1:
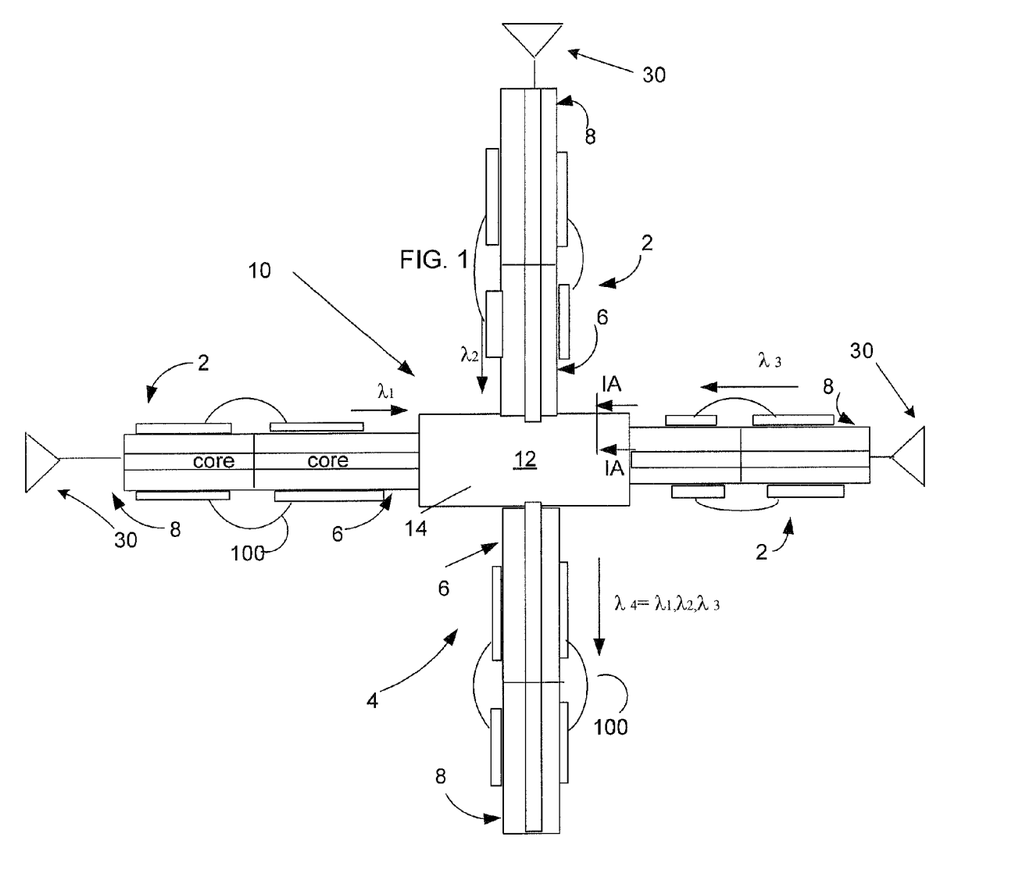
FIG. 1 is a view illustrating a high-power single-mode fiber laser system configured in accordance with the disclosure.

FIG. 1 illustrates a high power fiber laser system 10 including a directional fiber pigtailed router configured with a HP multi-port circulator 12 and a plurality of launching components 2 and receiving components 4. The launching component 2 is configured to deliver a SM signal into an input port 18 of circulator 12. The SM signal, after being guided along a predetermined path towards an output port 24, is coupled into receiving component 4 over free space. In case of additional ports 20 and 22, respectively, additional launching components 2 are configured to launch respective input signals into circulator 12 over tree space in such a way that multiple input signals $\lambda_1, \lambda_2, \lambda_3$ are, for example, are multiplexed into an output beam $\lambda_4$. Of course, the reverse operation-demultiplexing—can also be performed by router 12. In this case an input signal is launched into input port 18, for example, and further demultipexed into three output signals propagating along respective ports.

The launching and receiving components 2 and 4, respectively, are similarly configured and each have a pigtailed SM passive fiber 6, configured as a GRIN fiber or multiclad fiber, and a delivery SM passive fiber 8 which is fused to pigtailed fiber 6. The delivery fibers 8 of respective launching components 2 are coupled to respective HP SM laser sources 30 which may be configured as continuous wave or pulsed fiber laser sources.

To strip clad-supported modes in both launching component and receiving component 4, which are particularly detrimental to the integrity of protective coatings 5 of respective passive pigtailed SM fiber 6 and SM delivery fibers 8. HP system 10 includes a light stripper 100 which extends between protective coatings 5. The light stripper 100 is operative to distributively remove a portion of radiation from the cladding of respective pigtailed fiber 6 and delivery fiber 8 before the portion of radiation reaches the protective coating of the delivery fiber. See U.S. Pat. No. 7,580,600 fully incorporated herein by reference and commonly owned with the present application. Also, light stripper 100 provides the desirable alignment between fibers 6 and 8, respectively, of each launching/receiving component. Id The pigtailed fibers each have an inner ends inserted into the circulator's port so as to launch and receive respective input and output signals over free space. The signal power may vary between about hundred watts to about one kW in continuous-wave laser configurations and reach kWs in pulsed laser configurations. In operation of system 10, there is a requirement for extracting the light at the desired wavelength propagating in a backward direction as an incident beam.

Figure 1A:
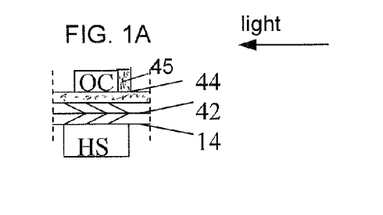
FIG. 1A is a cross section of a housing of multi-port fiber pigtailed router of FIG. 1 taken along lines IA-IA.

Referring to FIG. 1A, a cross-section view of pigtailed router 12, taken along lines IA-IA of FIG. 1, illustrates the router's certain structural specifics providing the router with the capability of withstanding high powers. Temperatures within case 14 reach elevated temperatures which can damage the optical components of the circulator enclosed in a case 14. To effectively dissipate heat from ease 14, the components, only one of which OC is shown, are directly mounted on a plate 42 made of, for example. Kovar© or any other material having a high thermal conductivity coefficient. The opposite side of plate 42 is in direct contact with the inner surface of case 14. The short heat path provides for effectively dissipating heat into an underlying heat sink HS.

A further improvement of router 12 is directed to the improved heat-resistance of the components and includes the use of anti-reflection coating 45 covering the surface of each optical component exposed to a light beam. The coating 45 reduces reflection into case 14 and returns the radiation back into the SM fibers. Furthermore, all of the components are configured with a large clear aperture which allows for a relatively large beam diameter of at least 0.5 mm. The larger the input beam, the lower the power density, the higher the threshold for nonlinearities, the higher the quality of the output beam. These improvements also increase the surface damage threshold of optical components.

The optical components are coupled to one another and case 14 by a layer of material epoxy 44. However, epoxy 44 does not interfere with the beam propagation since it disposed directly on heat conducting plate 42 off the light path. To avoid nonuniform expansion, the components are configured from material having a uniform coefficient of expansion.

Figure 2:
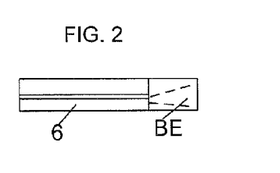
FIG. 2 illustrates a beam expander mounted to the end of respective pigtailed SM passive fibers launching input signals in and receiving output signals from the pigtailed router over free space.

FIG. 2 illustrates a beam expander BE coupled to the end of each pigtailed fiber 6 which faces the port of router 12. Configured for reducing power density of input signals, the beam expander BE is coupled to the inner end of pigtailed fiber 6. Functionally, the beam expander provides for a relatively low power density of input signals which can be, otherwise, sufficiently high to damage optical components of router 12. Structurally, beam expander BE may include a GRIN fiber or coreless passive fiber.

Figure 3:
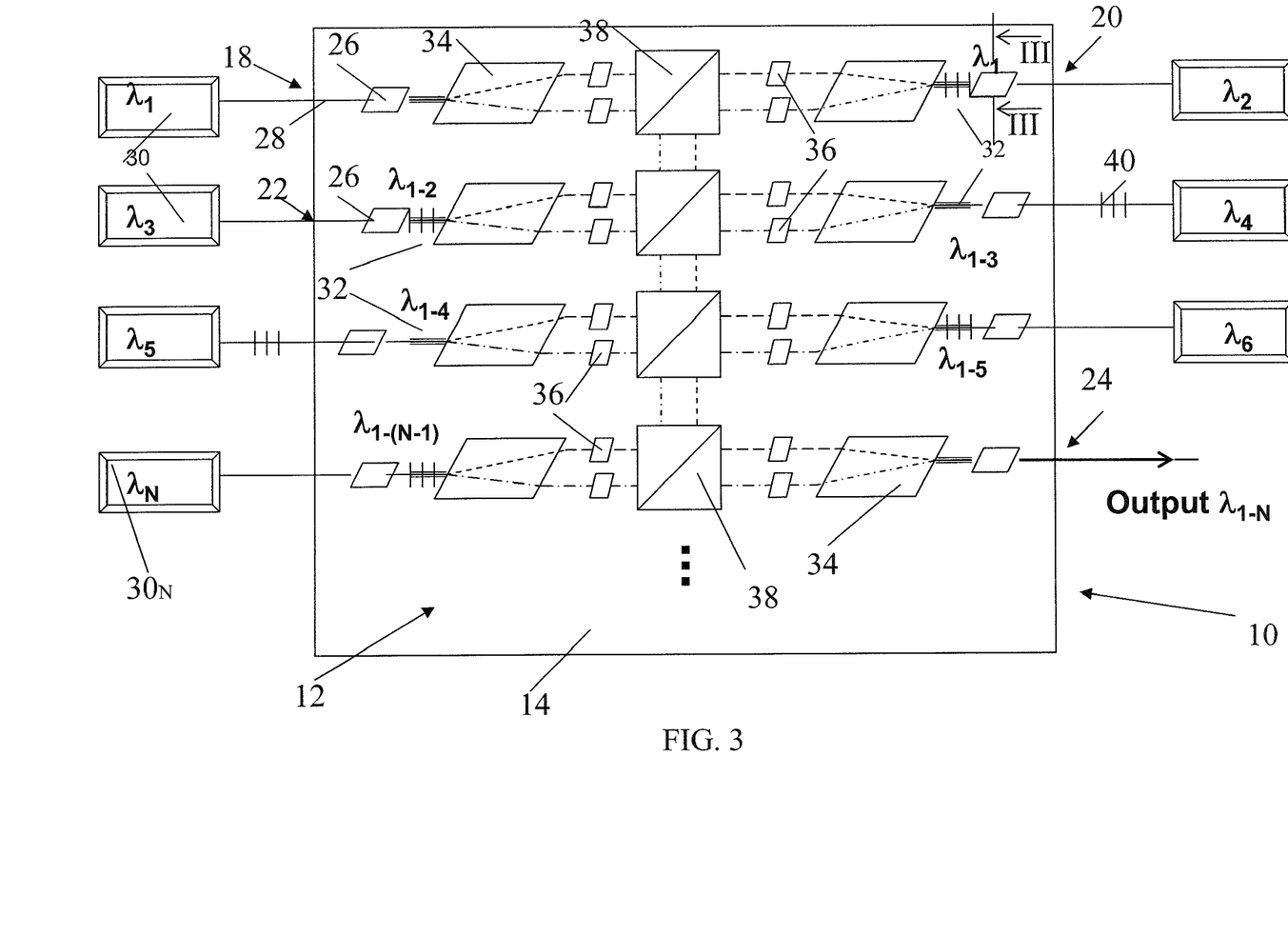
FIG. 3 illustrates the operation of the pigtailed fiber router of FIG. 1.

FIG. 3 illustrates the optical components of router 12 operating here as a multiplexer. In particular, router 12 of system 10 is provided with multiple ports, only four 18, 20, 22 and 24, respectively, of which are denoted. Each port includes a focusing component, such as lens 26 receiving substantially a SM light beam from pigtailed fiber 6, a polarization beam displacer 34 and Faraday rotators 36, the structure and function of which are known to an ordinary skilled workers. Mounted between the ports are respective polarization splitting cubes 38 redirecting signals between the optical ports. In operation of system 10, there is a requirement fore extracting the light at the desired wavelength propagating in a backward direction as an incident beam. This is accomplished, by changing the polarization of Faraday rotators 36 in such a way that the polarizing cube 38 redirects the backward beam out of the initial path.

Provided only as an example, system 10 of FIG. 3 is configured as a dense wavelength division multiplexing (DWDM) in which many tightly spaced frequency channels $\lambda_1$–$\lambda_n$ are either combined or separated. In case of multiplexing, router 12 provides for a powerful kW output signal exiting housing 14 though an output port OP at a wavelength $\lambda_{1-n}$. As can be seen, the number of ports is arbitrary and limited only by the quality of the output signal and internal losses. The DWDM system 10 allows applications in many fields such as laser marking, laser cutting, and laser welding possibly at a higher optical efficiency with high optical brightness When using single mode laser diodes or single mode fiber lasers. All of these application may require a high quality substantially SM mode output radiation. As clearly realized by an artisan, instead of multiplexing, system 10 may operate as a demultiplexer operative to split the single input SM beam into a plurality of beams exiting through respective ports of router 12 by means of wavelength selective components 32 and 40.

Figure 4:
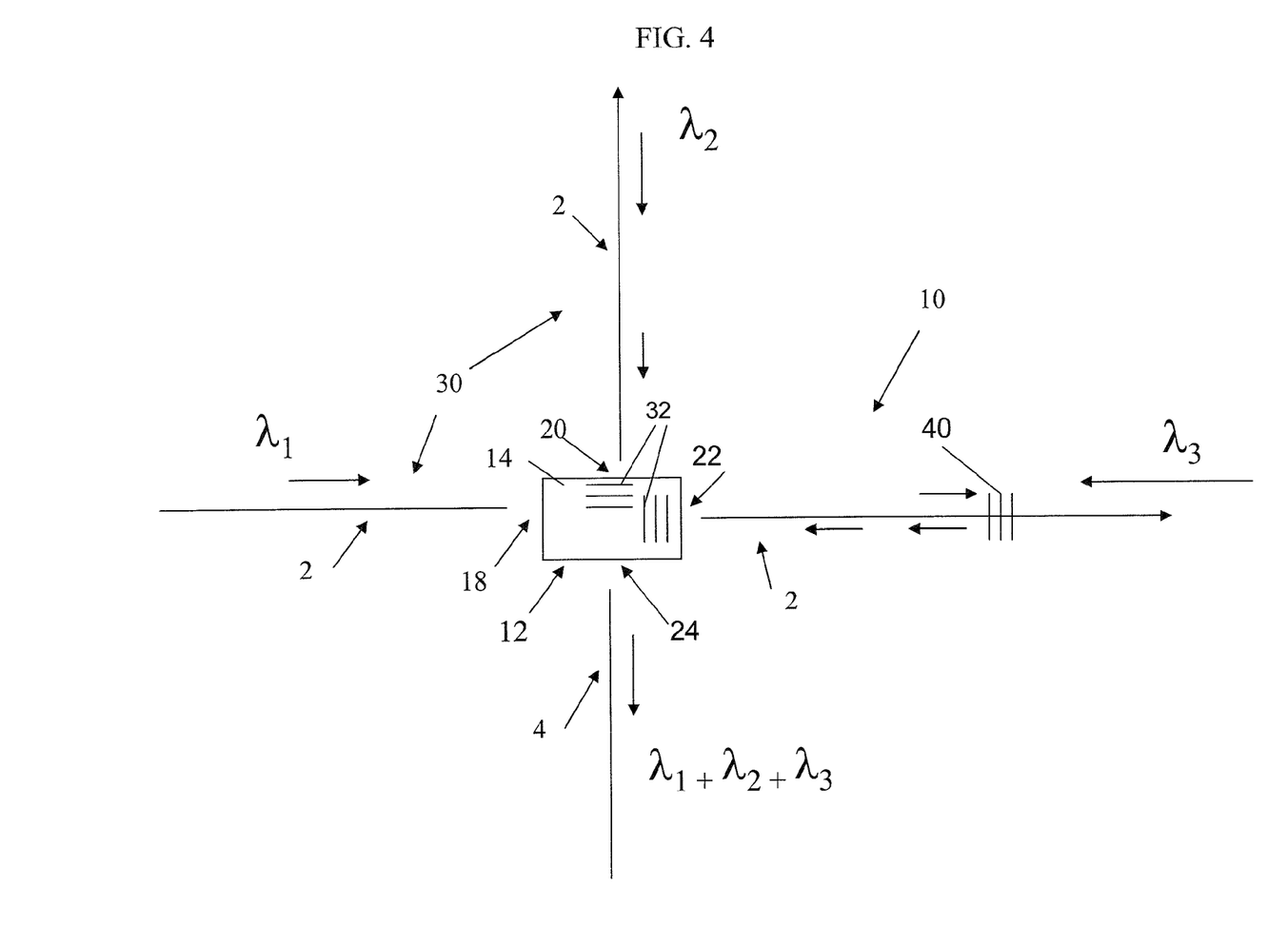
FIG. 4 is a diagrammatic view of the disclosed high power fiber laser system utilizing a pigtailed fiber router configured to operate as a high power DWDM multiplexer and demultiplexer.

FIG. 4 illustrates the operation of four-port router 12 operating as a multiplexer. In particular, the first input signal at frequency $\lambda_1$ is delivered to first input port 18 by first launching component 2. Upon being optically treated in a known manner by lens 26 (FIG. 2), beam displacer 34. Faraday rotators 36, the first signal impinges upon first cube 38 configured to route the first input signal along a second port 20.

To allow the selective input/output of wavelengths by router 12, it is necessary to provide wavelength selector, such as Bragg gratings well known in the laser arts. The Bragg gratings, such as fiber Bragg grating (FBG) 40, may be written in the fiber pigtailed fibers associated with, for example, respective ports 20 and 22. Alternatively or in addition to FBGs, volume Bragg gratings (VBG) 32 can be used as well when provided inside housing 14 of router 12. Both configurations of the Bragg grating are well known to one of ordinary skills in the laser arts and, thus, are not explained here in detail. Generally, a VBG can withstand higher powers than a FBG, but in most applications both grating configurations are interchangeable or complementary.

Accordingly, the first grating, such as VBG 32, is disposed along the light path in the second port 20 of circulator 12 and configured to reflect the first signal at wavelength $\lambda_1$, thus, preventing its propagation along second port 20. However, first VBG 32 is transparent to a second input signal at wavelength $\lambda_2$ generated by another source 30 and coupled into port 20. As a consequence light at frequency $\lambda_1 + \lambda k_2$ is further routed towards third channel.

To prevent the $\lambda_1$, $\lambda_2$ light beam from exiting circulator 12 through third port 22, the optical channel associated with this port is provided, with for example one VBG 32 and one FBG 40. For example, VBG 32 is configured to reflect light beam at first wavelength $\lambda_1$, whereas FBG 40 is operative to reflect light at wavelength $\lambda_2$.

The schematic shown in FIG. 4 is based on the assumption that first signal $\lambda_1$ is substantially more powerful than second signal $\lambda_2$ which can be handled by FBG 40. Of course, the grating configuration may be different. For example, light at second wavelength $\lambda_2$ may be powerful enough to warrant the disposal of a second VBG within case 14 of circulator eliminating, thus, a need for FBG 40. Alternatively, the first input signal may be sufficiently weak to use the FBG in port 22, but the second input signal is strong requiring a VBG in port 22.

Still a further alternative configuration of system 10 may provide for only FBGs 40 if both input signals are not overly powerful.

Returning to the operation of router 12, both VBG 32 and FBG 40 are transparent to a third input signal at wavelength $\lambda_3$ coupled in port 22 and further multiplexed with first and second input signals into an output $\lambda_1, \lambda_2, \lambda_3$ signal. The output single mode signal is guided along fourth port 24 and radiated therethrough. Accordingly, circulator 12 thus provides for the resultant single mode high power output propagating over free space before being coupled into a receiving pigtailed fiber.

Figure 5:
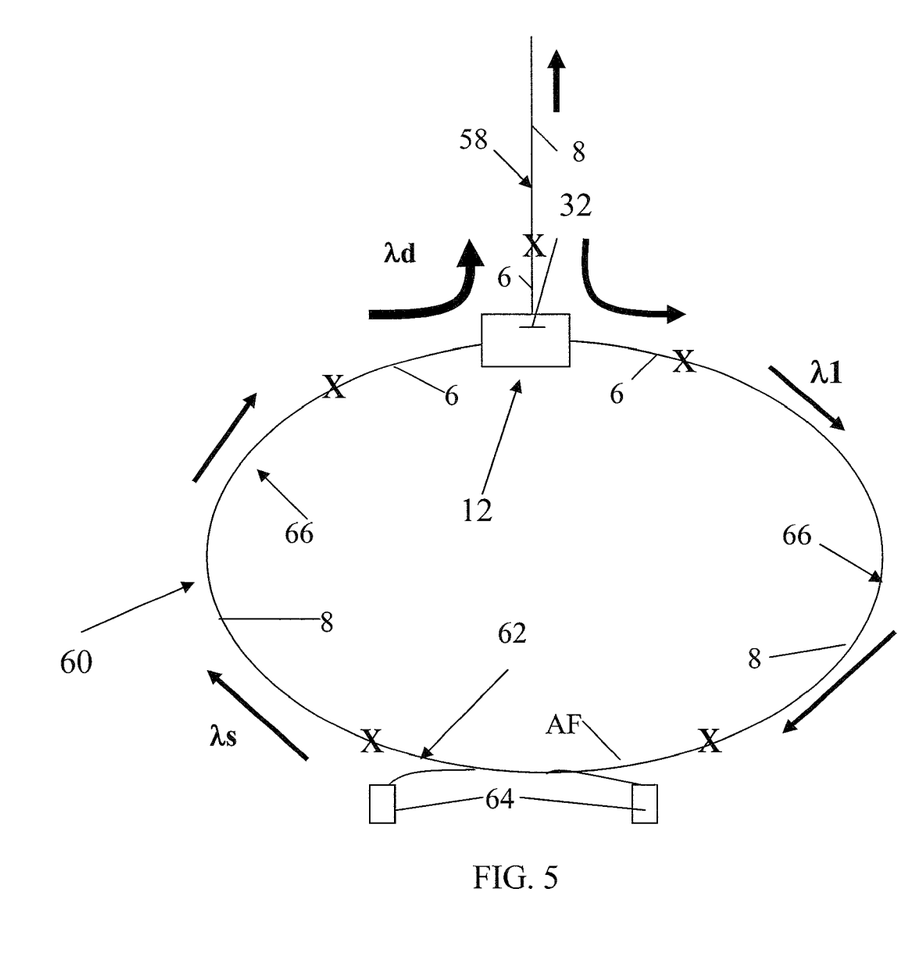
FIG. 5 is a diagrammatic view of another embodiment of the disclosed high power laser system utilizing a pigtailed fiber router which is operative as an intra-cavity wavelength selector.

FIG. 5 illustrates a further configuration of disclosed HP fiber laser system 60 provided with pigtailed router 12. In particular, system 60 is configured with an active fiber 62 radiating SM light at wavelength $\lambda_s$, pump 64 coupled to active fiber 62, and a passive delivery component 66 including two pairs of spliced pigtailed pigtailed fiber 6 and delivery fiber 8. The active fibers 62, passive fiber component 66 and router 12 are coupled to one another so as to define a laser ring cavity. Accordingly, the SM input radiation at wavelength $\lambda_1$ continuously circulates along the ring cavity reaching high energies. Coupled to opposite ends of passive fiber 66 over free space and, thus, forming a segment of the cavity is multi-port router 12 provided with, for example, internal VBG 32 which is partially transparent and partially reflective to wavelength $\lambda_s$ to allow part of the radiation to be coupled into delivery component fiber 58, which is also configured with pigtailed fiber 6 and delivery fiber 8, and guided out of the cavity.

Figure 6:
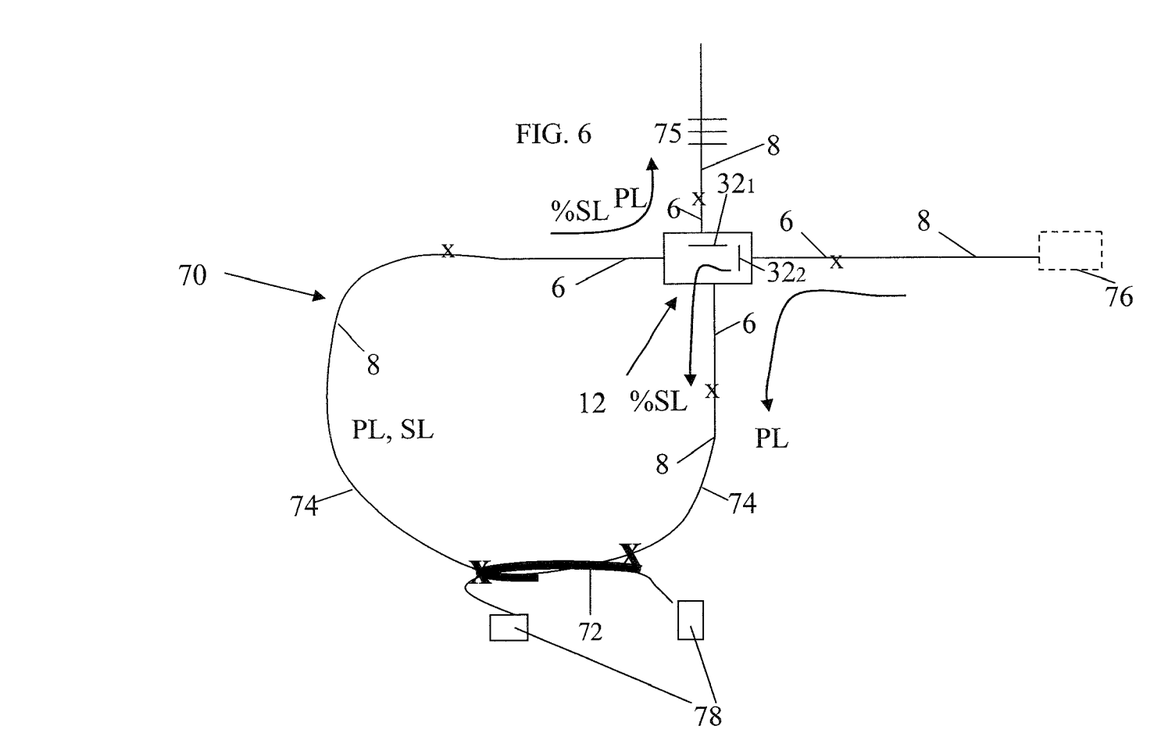
FIG. 6 is a diagrammatic view of still another embodiment of the disclosed high power laser system with a pigtailed fiber router configured to operate as an intra-cavity wavelength filter.

FIG. 6 illustrates a laser system 70 having a coupled cavity configuration and including an active fiber 72 pumped by a pump 78, passive fiber component 74, which includes pigtailed fiber 6 and delivery fiber 8, and first fully reflective VBG $32_1$ in circulator 12 all together defining a first cavity. The same fibers 72 and 74, respectively, and partially reflective second VBG $32_2$ define a second cavity. The system 70 may be effectively used for narrowing a linewidth, as explained immediately below.

The system 70 is also configured to filter wavelengths generated by nonlinear effects such as, among others, stimulated Brillion scattering and stimulated Raman scattering. Additional gratings specifically configured to guide the parasitic wavelengths out of the coupled cavity can realize the wavelength filtering operation. The grating may be formed as either additional VBGs or, preferably, as external FBGs 75 each for specified wavelength. As an alternative to reflective FBGs, system 70 may be provided with a chirped FBG capturing the specified wavelengths.

The configuration of system 70 may be slightly modified, as shown by dash lines. In particular, instead of pump 78, system 70 may have a fiber laser 76 operative to pump active fiber 72. The pump and signal wavelength may be selected in accordance with local requirements. For example, pump 76 may be configured as a Raman laser radiating light at a 1480 nm wavelength sufficient to have Er or Er—Yb doped fiber 72 emit radiation at a 1560 nm wavelength. The fully reflective second grating VBG $32_2$ (or FBG) is configured to reflect the signal wavelength back into the cavity but transmit the pump light inside router 12. The first grating VBG $32_1$ partially reflects the lazed signal and partially transmits it while fully transmitting the pump light out of the cavity.

Figure 7:
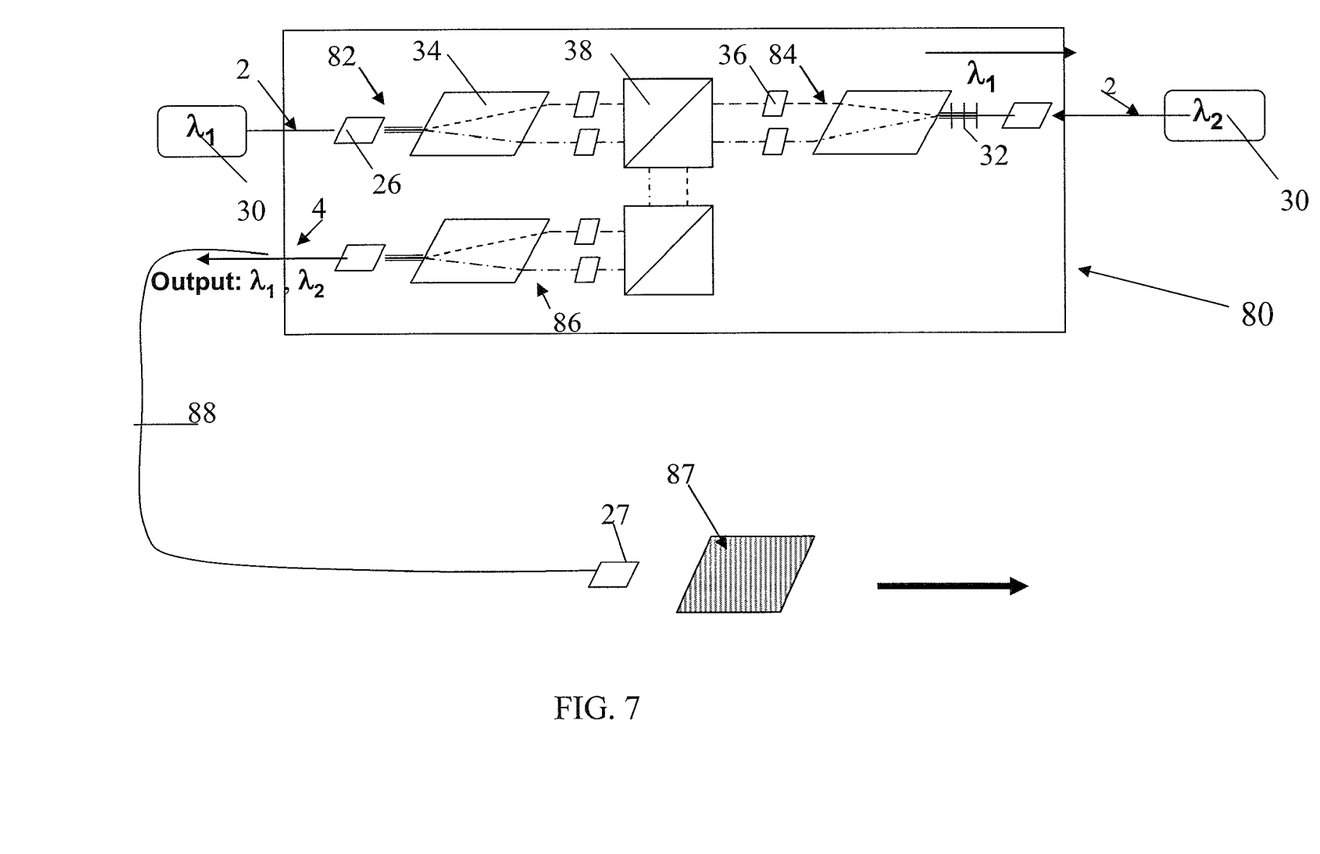
FIG. 7 is a diagrammatic view of another embodiment of the disclosed high power laser system incorporating the disclosed circulator which is configured as a wavelength converter, such as DFM.

FIG. 7 illustrates a further configuration of high power laser system 80 operative to generate other wavelengths (fixed or tunable) through nonlinear frequency conversion such as difference frequency mixing (DFM) and sum frequency mixing which may require collinear beams exiting from a single fiber. The system 80 may include single frequency (SF) or pulsed laser 30 emitting a high power SM input light beam at wavelength $\lambda_1$ which is coupled into the input port of circulator 12. The input beam propagates along first transmitting component 2 and coupled into a first input optical port 82 which is defined by pigtailed fiber lens 26, polarization combiner or splitter 34 and Faraday rotators 36. Upon impinging first polarization cube 38, the input signal at wavelength $\lambda_1$ continues to propagate along second port 84. The second port 84, in addition to the same components as the first channel, also includes grating 32 which is tuned to fully reflect first beam $\lambda_1$. At the same time, grating 40 is transparent to a high power signal $\lambda_2$ radiated by second SF or pulsed laser 30 coupled to the second input port of system 80.

The beams at respective wavelengths $\lambda_1$ and $\lambda_2$ bounce from polarization cubes 38 into an output optical port 86 and coupled into a delivery fiber 88. Focused by a delivery lens 27 onto a nonlinear optical crystal 87, the signals are converted into the output system signal at the desired wavelength. The crystal 87 may be phase matched to the desired wavelength to provide either for a difference frequency mixing or sum frequency mixing operation.

For example, system 80 may be configured to combine two closely spaced wavelengths $\lambda_1$ and $\lambda_2$ to perform the different frequency mixing DFM in nonlinear crystal 87 to generate THz frequencies. The THz energy, in turn, may be used for imaging application to help airport security and/or medial imaging.

Figure 8:
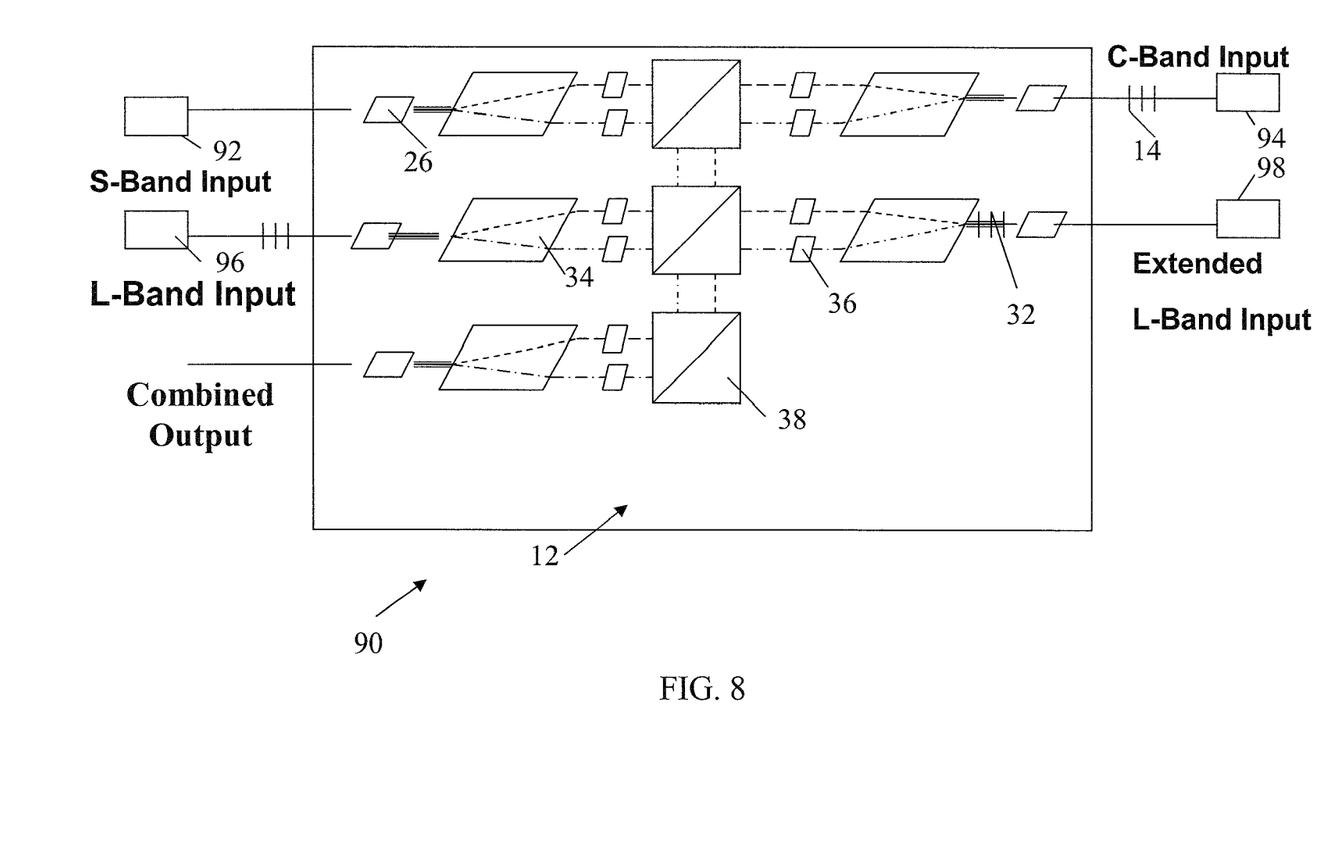
FIG. 8 is a diagrammatic view of a laser-assisted telecommunication system configured with the disclosed circulator which is structured to be a coarse wavelength division multiplexer.

FIG. 8 illustrates a laser system 90 provided with pigtailed fiber router 12 which is configured to provide for coarse wavelength division multiplexing. The system 90 is operative to combine bands of wavelengths. As an example, a C-band, an L-band, an S-Band, and extended L-Band telecom high power amplifiers 92, 94, 96 and 98 respectively, can be combined in order to expand the optical bandwidth of an optical communication system. The combined total output powers of such amplifiers are high enough to require circulator 12 be configured as a high power WDM component with VBGs 32 which are located at least in some of the optical channels of the circulator. A combination of VBGs 32 and FBGs is also possible in system 90.

Figure 9:
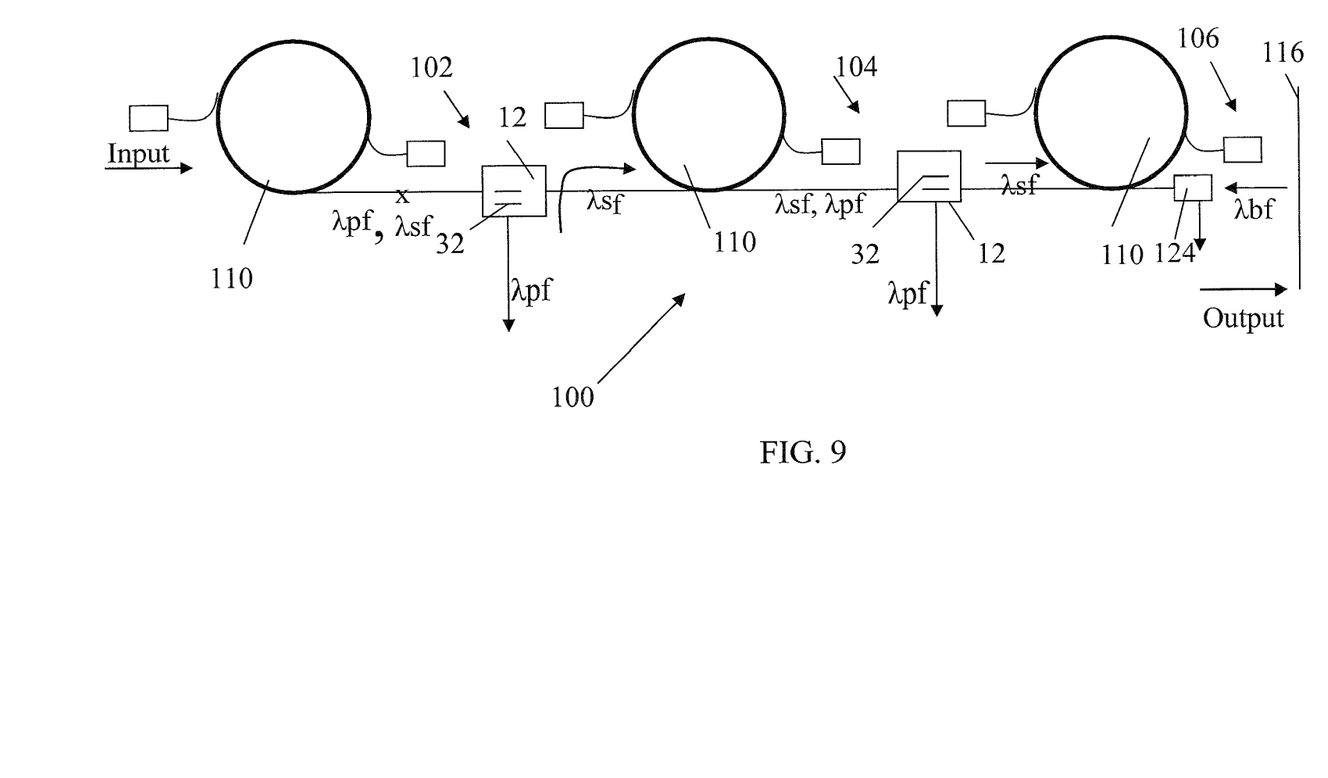
FIG. 9 is a diagrammatic view of a further embodiment of the high power laser system utilizing the disclosed circulator which is configured as a filter for decreasing negative effects produced by a variety of non-linear effects.

FIG. 9 illustrates a HPF multi-cascaded laser system 100 provided with router 12 which is configured as an isolator to prevent propagation of parasitic signals in both forward and backward directions. In systems configured as system 100, it is often required to filter out amplified spontaneous emission (ASE) in order to improve in-band power, reduce noise figure, and increase threshold for optical nonlinearities. This is especially useful for SM amplifiers providing gain of optical pulses in which not only the ASE is filtered out, but also other parasitic signals related to a variety of optical nonlinearites. As the optical power of the amplifiers is sealed, high power circulator 12 is becoming increasing important.

Figure 9A:
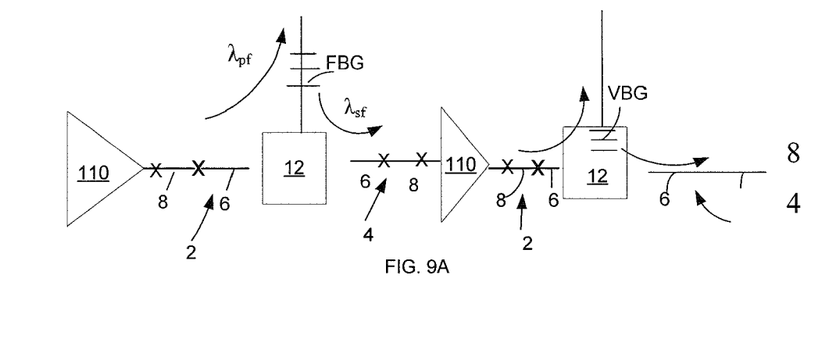
FIG. 9A illustrates one embodiment of the multi-port directional fiber router of FIG. 9.

In particular, system 100 includes multiple amplifying stages or cascades 102, 104 and 106, respectively, provided with respective gain blocks 110 which are isolated from one another by respective routers. The gain blocks of the respective cascades each are coupled to router 12 by means of launching/receiving unit including passive delivery fiber 8 and pigtailed pigtailed fiber 6. High energies of the signal propagating along system 100 are accompanied by parasitic signals, such as ASE or SRS, which are also amplified in each subsequent gain block 110. The parasitic signals propagate at frequencies $\lambda_{pf}$ different from the desired wavelength $\lambda_{sf}$. Accordingly, three-port router 12 includes a grating, such as VBG 32 or FBG (not shown), configured in the dumping port to transmit dump parasitic frequencies $\lambda_{pf}$ but reflect the desired frequency $\lambda_{sf}$ that propagates further to the next cascade and eventually is outputted by system 100 as schematically shown in FIG. 9A.

The system 100 may find numerous applications. For example, it may be configured to weld work pieces together or cut a work piece 116 into parts. In either case, the systems like system 100 always have a backreflected signal propagate along system 100 towards cascade 102 at wavelength $\lambda_{sr}$ equal, of course, to $\lambda_{sf}$. As a rule, optical isolators 118 may somewhat reduce the detrimental effect of high power backreflected signals. The parasitic backreflected signals that, like the backreflected signal at the desired wavelength, are amplified in the amplifying cascades and may reach high dB levels. To prevent these powerful backreflected signals $\lambda_{br}$, the Faraday rotators of end router 124, located next to the reflecting work piece 116, may be oriented so that the entire backreflected signal is dumped through an appropriate port 24. Other router 12 may also be configured to dump the backreflected signals working, thereby, as isolators.

Figure 9B:
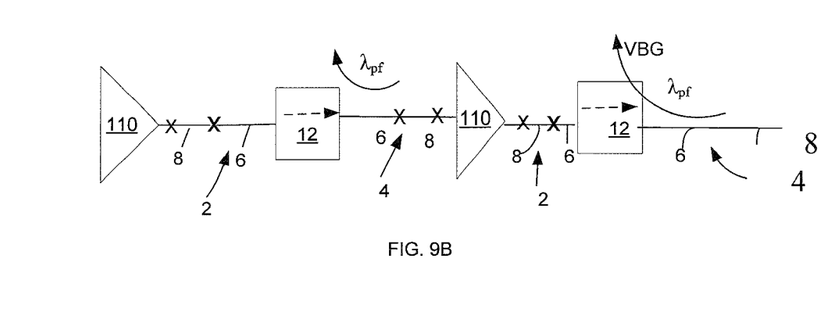
FIG. 9B illustrates another embodiment of the multi-port directional fiber router of FIG. 9 configured as an isolator.

Referring to FIG. 9B, HP fiber laser system 100 is particularly vulnerable with the manifestation of self saturation effect—propagation of ASE in a backward direction. In this case, pigtailed router 12 is configured as an isolator having the output port guide the backreflected parasitic frequency $\lambda_{pf}$ along an evacuation light path.

Figure 10:
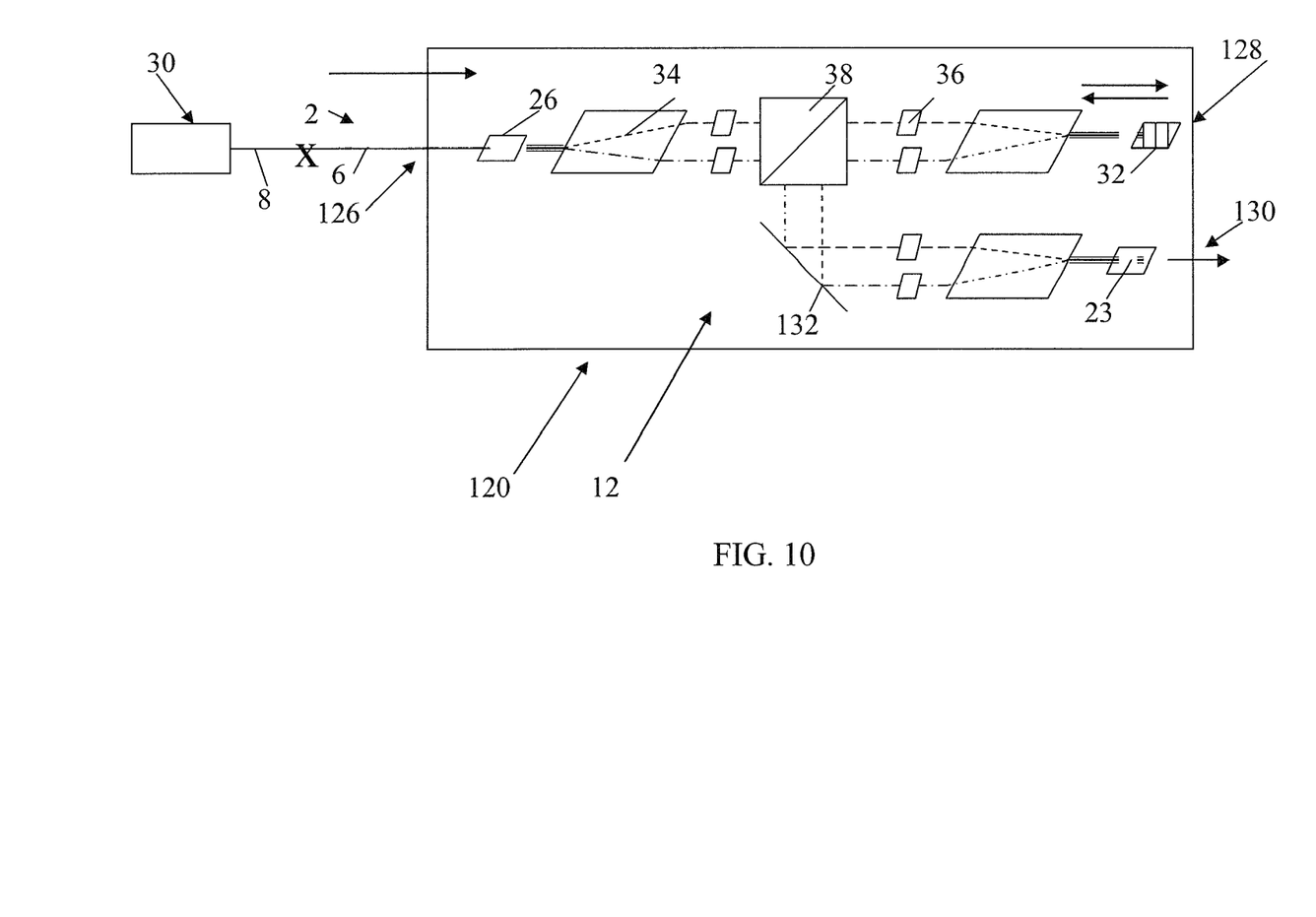
FIG. 10 is a diagrammatic view of still another embodiment of the high power pulsed laser system incorporating the disclosed circulator.

FIG. 10 illustrates a high power pulsed fiber laser system 120 operating in reflection and being optimum for collinear beams. In order to extract the beam propagating along the same path as the incident beam, a high power circulator is required. The following discussion relates to the system operative to a termination unit operative to extract compressed pulses.

An input signal configured as a chirped and amplified stretched optical pulse from source 30 is guided by a launching component 21 including the pigtailed and delivery passive fibers 6 and 8, respectively. The inner end of pigtailed fiber 6 launched the input signal into input port 126 of router 12. Guided towards port 128, the input signal is incident upon VBG 32 which is capable of withstanding high peak powers that may be damaging to fiber Bragg gratings and operative to compress the pulses. In operation of system 120, there is a requirement for extracting the light at the desired wavelength propagating in a backward direction as an incident beam. This is accomplished by changing the polarization by means of Faraday rotators 36 in such a way that the polarizing cube 38 redirects the reflected compressed pulses towards a mirror 132 out of the initial path. As a result, the output beam having a high peak intensity and short duration, propagates along output port 130 and, upon being focused by output lens 23, is dumped outside router 12 without the use of the output fiber component. The use of VBG 32 in this configuration eliminates the need for light stripper of FIG. 1.

The system 120 can be used for both compressing and stretching optical pulses. In the pulse stretching operation, system 120 can be configured with a FBG instead of VBG 32 because the power density is substantially lower than that one in the pulse compressing configuration.

The foregoing description and examples have been set forth merely to illustrate the disclosure and are not intended to be limiting. Accordingly, disclosure should be construed broadly to include all variation within the scope of the appended claims.

The invention claimed is:
1. A high-power single-mode (HPSM) fiber laser system, comprising:
    a directional fiber router provided with a plurality of spaced ports;

a launching fiber component coupling a SM input signal over free space into one of the ports, the launching component having passive delivery and pigtailed SM fibers spliced to one another;

a receiving fiber component receiving a SM output signal over free space from an other port of the router, the receiving fiber component having spliced pigtailed and delivery single mode (SM) passive fibers, wherein an inner end of the launching component couples the input signal into the one port and an inner end of the receiving component receives the output signal;

a light stripper extending between protective coatings of respective delivery and pigtailed fibers of each fiber component, the light stripper being operative to distributively remove a portion of the SM signal from the cladding of one of passive fiber before the portion reaches the protective coating of the other passive fiber, wherein the multi-port router is configured with an additional input port receiving a second input signal over free space from a second launching component, the additional port having a wavelength-selective component configured to transmit the second input signal but reflect the input signal from the one input port so that the input signals are multiplexed to define the output signal; and a nonlinear optical crystal receiving the SM output signal from the delivery passive fiber of the receiving component the crystal being phase matched to a desired wavelength.

2. A higher single-mode (HPSM) fiber laser system, comprising:

a directional fiber router provided with a plurality of spaced ports;

a launching fiber component coupling a SM input signal over free space into one of the ports, the launching component having passive delivery and pigtailed SM fibers spliced to one another;

a receiving fiber component receiving a SM output signal over free space from an other port of the router, the receiving fiber component having spliced pigtailed and delivery single mode (SM) passive fibers, wherein an inner end of the launching component couples the input signal into the one port and an inner end of the receiving component receives the output signal;

a light stripper extending between protective coatings of respective delivery and pigtailed fibers of each fiber component, the light stripper being operative to distributively remove a portion of the SM signal from the cladding of one of passive fiber before the portion reaches the protective coating of the other passive fiber:

a gain block including an active multiclad fiber and two SM block passive fibers which are coupled to opposite ends of the active fiber radiating the SM input signal, the router having an additional port located between the input and other ports, an additional receiving component configured identically to the receiving component of the other port and operatively connected to the additional port of the router, a delivery fiber of one of the two receiving components being spliced to one of the passive fibers of the gain block, the launching component being operatively connected to the other passive fiber of the gain block, the gain block, router, launching and receiving fiber components are coupled together to define a ring cavity, and the additional port having a wavelength-selective component partially reflecting the output signal back into the ring cavity and partially transmitting the output signal coupled into the ring cavity thought the other port.

3. The HPSM fiber laser system of claim 2 further comprising:

a pump unit radiating a pump signal at a wavelength different from a wavelength of the input signal which his coupled into the one port of the router;

an other launching fiber component receiving the pump signal from the pump unit and launching the pump signal into a third additional port of the router which is located between the two additional ports, an additional wavelength-selective component in optical communication with the third additional port of the router, the additional wavelength component being configured to transmit the pump signal and reflect the output signal from the one port so that a multiplexed signal is coupled into the gain block substantially absorbing the pump signal.

4. A high-power single-mode (HPSM) fiber laser system, comprising:

a directional fiber router provided with a plurality of spaced ports;

a launching fiber component coupling a SM input signal over free space into one of the ports, the launching component having passive delivery and pigtailed SM fibers spliced to one another;

a receiving fiber component receiving a SM output signal over free space from an other port of the router, the receiving fiber component having spliced pigtailed and delivery single mode (SM) passive fibers, wherein an inner end of the launching component couples the input signal into the one port and an inner end of the receiving component receives the output signal;

a light stripper extending between protective coatings of respective delivery and pigtailed fibers of each fiber component, the tight stripper being operative to distributively remove a portion of the SM signal from the cladding of one of passive fiber before the portion reaches the protective coating of the other passive fiber, a plurality of HP gain blocks spaced from one another along a light path and operative to gradually amplify the SM input signal and a parasitic signal co-propagating along a path, adjacent upstream and downstream gain blocks being configured so that the upstream gain block is spliced to the launching fiber component, the downstream gain block being spliced to the receiving component, the pigtailed fibers of the respective launching and receiving components being operatively connected with the input and other ports, respectively, the router having a second port located between the one and other ports;

an additional receiving fiber component operatively connected to the second port; and a wavelength selective component operatively connected to the second port and additional receiving fiber component, the wavelength selective component being configured to transmit the parasitic signal, which is coupled to the second receiving fiber component over free space, and reflect the input signal towards the other port.

5. A high-power single-mode (HPSM) fiber laser system, comprising:

a directional fiber router provided with a plurality of spaced ports;

a launching fiber component coupling a SM input signal over free space into one of the ports, the launching component having passive delivery and pigtailed SM fibers plied to one another;

a receiving fiber component receiving a SM output signal over free space from an other port of the router, the receiving fiber component having spliced pigtailed and delivery single mode (SM) passive fibers, wherein an inner end of the launching component couples the input signal into the one port and an inner end of the receiving component receives the output signal;

a light stripper extending between protective coatings of respective delivery and pigtailed fibers of each fiber component, the light stripper being operative to distributively remove a portion of the SM signal from the cladding of one of passive fiber before the portion reaches the protective coating of the other passive fiber;

a plurality of HP gain blocks spaced from one another along a light path and operative to amplify the SM input signal and a parasitic signal, the input and parasitic signal propagating in opposite directions along the light path, adjacent upstream and downstream gain blocks being operative connected to one another so that the upstream and downstream gain blocks are spliced to respective launching and receiving fiber components, the pigtailed fibers of the respective launching and receiving components being operatively connected to the input and other ports, respectively, the router having a second port located between the one and other ports and being configured to dump the parasitic signal through the second port while guiding the input signal towards the other port.

* * * * *